US 6,718,805 B2

(12) United States Patent
Okuno

(10) Patent No.: US 6,718,805 B2
(45) Date of Patent: Apr. 13, 2004

(54) STEERING WHEEL LOCKING DEVICE

(75) Inventor: Masanari Okuno, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/160,755

(22) Filed: May 31, 2002

(65) Prior Publication Data
US 2002/0178769 A1 Dec. 5, 2002

(30) Foreign Application Priority Data
Jun. 1, 2001 (JP) ........................ 2001-166976

(51) Int. Cl.[7] .................. G05G 5/00; B60R 25/02
(52) U.S. Cl. ................................ 70/186; 70/252
(58) Field of Search .................. 70/184–186, 252, 70/182, 183, 237, 387

(56) References Cited

U.S. PATENT DOCUMENTS

| 3,789,636 | A | * | 2/1974 | Nakashima | 70/252 |
| 4,400,954 | A | | 8/1983 | Nakamoto et al. | 70/186 |
| 4,771,619 | A | * | 9/1988 | Shiramizu et al. | 70/186 |
| 4,972,692 | A | * | 11/1990 | Morikawa et al. | 70/186 |
| 5,036,686 | A | * | 8/1991 | Ichinose | 70/186 |
| 5,255,547 | A | * | 10/1993 | Burr et al. | 70/252 |
| 5,271,252 | A | | 12/1993 | Yasuhara et al. | 70/186 |
| 6,467,319 | B1 | * | 10/2002 | Karasik et al. | 70/186 |
| 2002/0092332 | A1 | * | 7/2002 | Canard | 70/186 |

FOREIGN PATENT DOCUMENTS

| DE | 2059215 | 6/1972 |
| EP | 0893315 A2 | 1/1999 |
| GB | 1335904 | 10/1973 |
| GB | 2018882 | 10/1979 |
| JP | 2001-323698 | 5/2000 |

* cited by examiner

Primary Examiner—John B. Walsh
(74) Attorney, Agent, or Firm—Sheridan Ross PC

(57) ABSTRACT

A steering wheel locking device is attached to a smart ignition system to lock a steering shaft. The device has a key cylinder having a key insertion portion. The key cylinder is rotated between a locked position and an actuation position. A switch knob rotates the key cylinder. A lock bar locks the steering shaft. When the key cylinder is rotated from the locked position to the actuation position, the lock bar releases the lock of the steering shaft. When the key cylinder is rotated from the locked position to the actuation position, a locking lever maintains the lock bar unlocked. A slide body is moved by a key inserted in the key insertion portion. When the key cylinder is rotated from the actuation position to the locked position, the locking lever maintains the lock bar unlocked by the engagement of the key and the slide body.

13 Claims, 5 Drawing Sheets

STEERING WHEEL LOCKING DEVICE

BACKGROUND OF THE INVENTION

The present invention relates to a steering wheel locking device that is installed in a smart ignition system.

A typical mechanical ignition key installed in a vehicle includes a cylinder lock. The cylinder lock permits a key cylinder to be rotated from a LOCK position (locked position) to an ACC position (actuation position) when a proper key is inserted in the key cylinder. When a driver turns the key cylinder using the key from the LOCK position to a START position via the ACC position and an ON position, the engine is started.

A steering wheel locking device that has the above mentioned ignition key prohibits the rotation of a steering shaft when a proper key is not inserted in the key cylinder. On the other hand, the cylinder lock permits the steering shaft to be rotated when the proper key is inserted in the key cylinder.

Instead of such mechanical ignition key, smart ignition systems, which do not have the cylinder lock, have come into wide use. In a smart ignition system, an ECU located in a vehicle cross-checks an identification code of a key that a driver carries against the identification code of each vehicle. The manipulation of the ignition switch for starting the engine is permitted based on the result of the cross-check.

That is, the ECU reads the identification code from a transmitter that the driver carries or the key inserted in a key cylinder. When the ECU determines that the identification code is proper, the ECU controls an electromagnetic solenoid and releases a lock pin, which restricts the rotation of the key cylinder.

In a steering wheel locking device installed in the smart ignition system, the ECU controls an actuator and permits the key cylinder to be rotated when the identification code of the key is proper. By rotating the key cylinder in this state, a lock bar, which restricts the rotation of a steering shaft, is released. Alternatively, the ECU controls the actuator and directly releases the lock bar when the identification code of the key is proper.

In the above mentioned steering wheel locking device, the steering shaft is locked in a state where the key is inserted in the key cylinder at the LOCK position. When the key cylinder is at the LOCK position, the steering shaft is always locked regardless of whether the key is inserted in the key cylinder. For example, when the key cylinder is rotated from the ACC position to the LOCK position using the key, the steering shaft is immediately locked. However, the driver feels uncomfortable because the steering shaft is locked even though the key is still inserted in the key cylinder.

SUMMARY OF THE INVENTION

Accordingly, it is an objective of the present invention to provide a steering wheel locking device installed in a smart ignition system. The steering wheel locking device has a mechanism to lock a steering wheel when a key is pulled out of a key cylinder.

To achieve the above objective, the present invention provides a steering wheel locking device, which is attached to a smart ignition system to lock a steering shaft. The device includes a rotor, a switch knob, a locking mechanism, and an unlock maintaining mechanism. The rotor has a key insertion portion. The rotor is rotated between a locked position and an actuation position. The switch knob rotates the rotor. The locking mechanism locks the steering shaft. When the rotor is rotated from the locked position to the actuation position, the locking mechanism releases the lock of the steering shaft. When the rotor is rotated from the locked position to the actuation position, the unlock maintaining mechanism maintains the locking mechanism unlocked. The unlock maintaining mechanism further includes a movable body. The movable body is moved by a key inserted in the key insertion portion. When the rotor is rotated from the actuation position to the locked position, the unlock maintaining mechanism maintains the locking mechanism unlocked by the engagement of the key and the movable body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
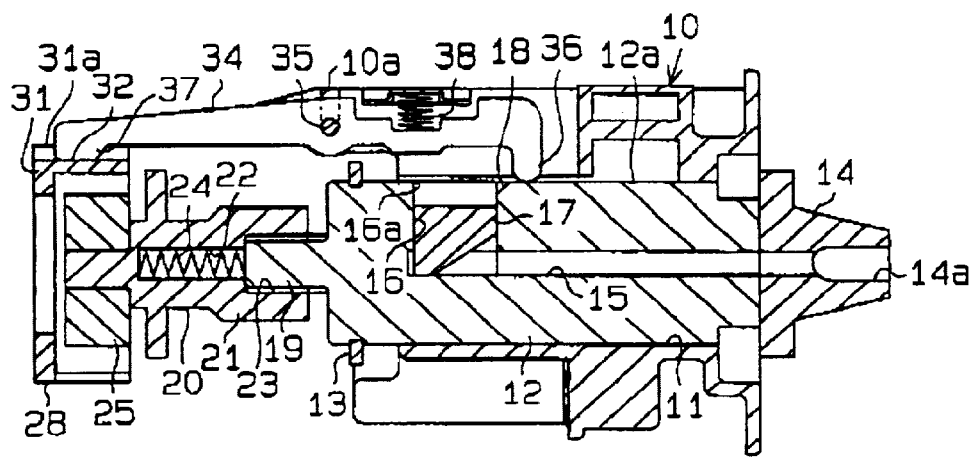
FIG. 1 is a diagrammatic cross-sectional view illustrating a steering wheel locking device according to a preferred embodiment of the present invention.

A preferred embodiment of the present invention will now be described with reference to FIGS. 1 to 8(b).

A steering wheel locking device according to the preferred embodiment is used in a vehicle that has a smart ignition system. When it is determined that an identification code of a transmitter that a driver carries matches with a proper identification code registered in advance, an ECU installed in a vehicle permits the manipulation of an ignition switch. In a case where the ECU cannot receive the identification code from the transmitter, the ECU permits the manipulation of the ignition switch when it is determined that an identification code of the key inserted in the key insertion portion matches with the proper identification code.

The steering wheel locking device according to the preferred embodiment includes, for example, a housing, which is a rotor case 10 in the preferred embodiment, a rotor, which is a key cylinder 12 in the preferred embodiment, a switch knob, 14, a movable body, which is a slide body 17 in the preferred embodiment, a camshaft 20, a cam (rotary cam) 25, a lock stopper 28, a lock bar 33, a locking lever 34, and a coil spring 38.

The camshaft 20, the cam 25, the lock stopper 28, and the lock bar 33 structure a locking mechanism. The key cylinder 12, the slide body 17, the lock stopper 28, the locking lever 34, and the coil spring 38 structure an unlock maintaining mechanism.

As shown in FIGS. 1 to 6, the rotor case 10, which is secured to a vehicle, has a support bore 11. The key cylinder 12, which is substantially columnar, is supported by the support bore 11, The key cylinder 12 rotates with respect to and axially moves along the support bore 11. An E-ring 13 is attached to an inner end (left side in FIG. 1) of the key cylinder 12 to prevent the key cylinder 12 from dropping off the support bore 11. The switch knob 14 of an ignition switch (not shown) is attached to an outer end (right side in FIG. 1) of the key cylinder 12. The switch knob 14 can be manipulated manually when the key K is not used. The key cylinder 12 and the switch knob 14 can be rotated among shift positions, which are a LOCK position (locked position), an ACC position (actuation position), an ON position, and a START position in the preferred embodiment. The ignition switch is shifted to positions corresponding to the four shift positions.

Figure 4:
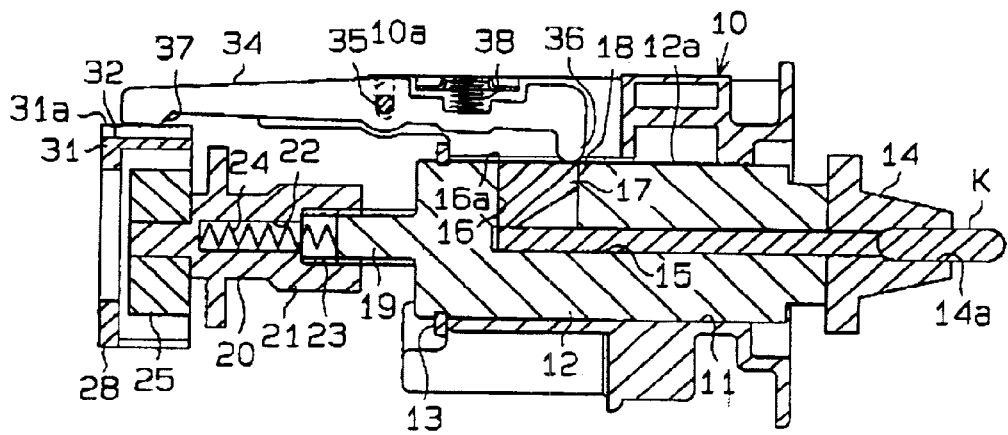
FIG. 4 is a diagrammatic cross-sectional view illustrating a state where the contact portion of the engaging member is in contact with the slide body while a key is inserted in the key cylinder of the device shown in FIG. 1.
Figure 5:
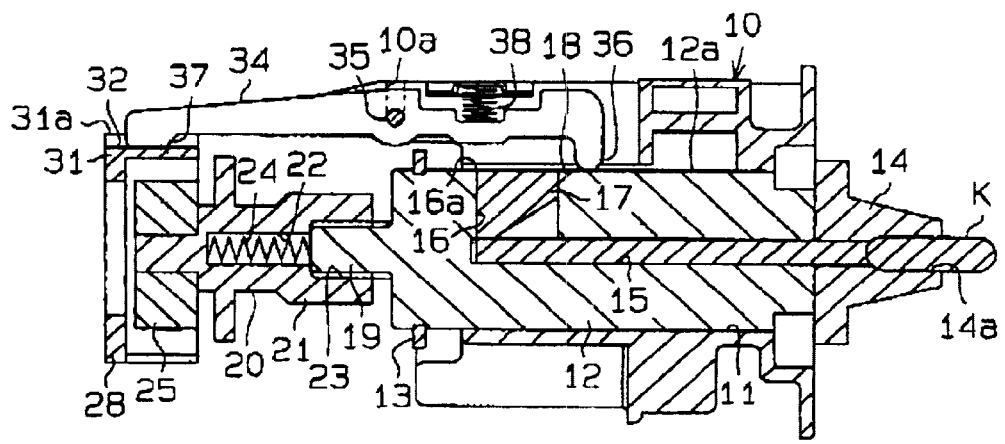
FIG. 5 is a diagrammatic cross-sectional view illustrating a state where the contact portion of the engaging member of the device shown in FIG. 4 is in contact with the peripheral surface of the key cylinder.
Figure 6:
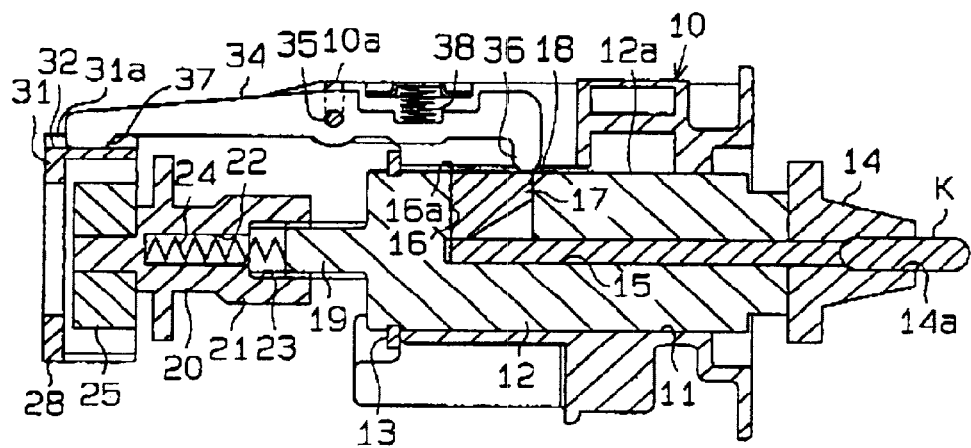
FIG. 6 is a diagrammatic cross-sectional view illustrating a state where the engaging portion of the engaging member of the device shown in FIG. 4 is engaged with the groove of the lock stopper.

The key cylinder 12 has a key insertion portion 15 for inserting a proper key K. The switch knob 14 has a key insertion opening 14a, which is communicated with the key insertion portion 15. As shown in FIGS. 4 to 6, the key K is inserted into the key insertion portion 15 through the key insertion opening 11a. When the key K is inserted, a reading device (not shown) reads the identification code of the key K stored in a transponder (not shown), which is embedded in the key K. An ECU (not shown) located in a vehicle cross-checks the detected identification code against the identification code of the vehicle, which is registered in advance. When it is determined that the identification code of the key K matches with the registered identification code, the ECU controls an electromagnetic solenoid (not shown) and releases a lock pin (not shown), which prohibits the rotation of the key cylinder 12. Also, even when the key K is not inserted into the key insertion portion 15, the ECU determines whether the identification code is proper when the identification code of the transmitter that the driver carries is received by the receiver (not shown). If it is determined that the identification code is proper, the ECU releases the lock pin.

Figure 2:
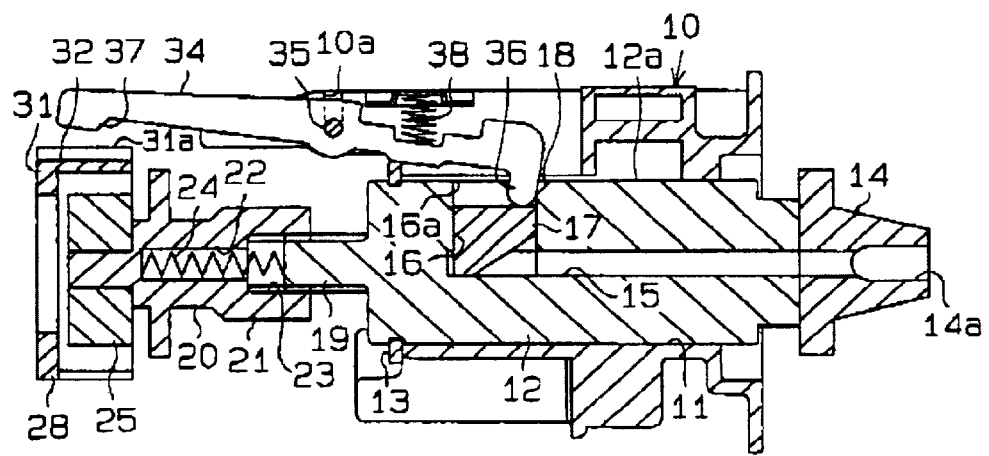
FIG. 2 is a diagrammatic cross-sectional view illustrating a state where the engaging portion of the engaging member of the device shown in FIG. 1 is apart from the side wall.
Figure 3:
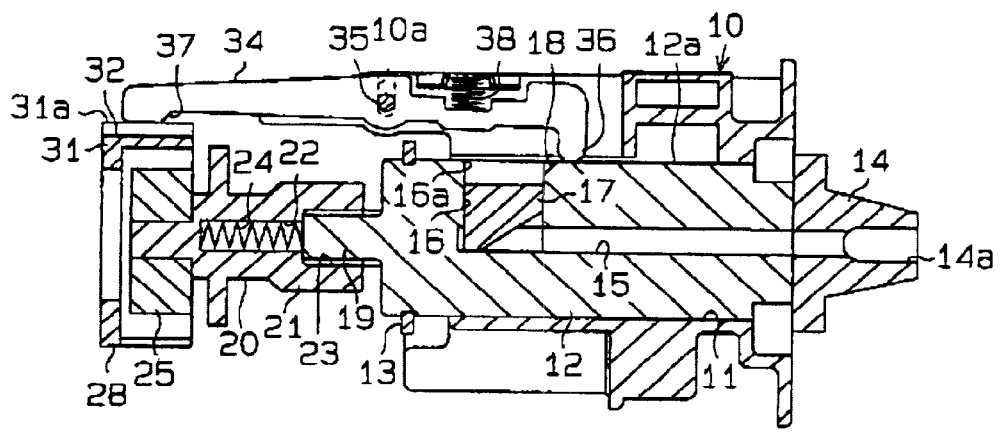
FIG. 3 is a diagrammatic cross-sectional view illustrating a state where the engaging portion of the engaging member of the device shown in FIG. 2 is in contact with the side wall.

The key cylinder 12 has a retaining bore 16, which has an opening 16a on a peripheral surface 12a of the key cylinder 12. The retaining bore 16 is communicated with the key insertion portion 15. The retaining bore 16 retains the slide body 17, which moves along the radial direction of the key cylinder 12. As shown in FIGS. 1 to 3, the slide body 17 moves toward the key insertion portion 15 (first position) from the opening 16a of the retaining bore 16 by its own weight when the key K is not inserted into the key insertion portion 15. On the other hand, when the key K is inserted into the key insertion portion 15 as shown in FIGS. 4 to 6, the slide body 17 moves to a position where the slide body 17 becomes flush with the peripheral surface 12a of the key cylinder 12 (second position).

The key cylinder 12 has a guide portion, which is a guide surface 18 in the preferred embodiment, at the periphery of the opening 16a of the retaining bore 16. The guide surface 18 is inclined with respect to a direction perpendicular to the rotary axis of the key cylinder 12. The guide surface 18 guides a contact portion 36 of the locking lever 34 toward the peripheral surface 12a of the key cylinder 12 when the switch knob 14 is depressed from the manipulation prohibited position (see FIG. 2) to the manipulation allowable position (see FIG. 1) without the key K being inserted into the key insertion portion 15.

A splined shaft 19 is integrally formed on the inner end of the key cylinder 12. The splined shaft 19 is coupled to the camshaft 20. The camshaft 20 is axially aligned with the key cylinder 12 and is rotatably supported by the rotor case 10.

The camshaft 20 does not move along the rotary axis. The camshaft 20 has a coupling portion 21, which is coupled to the splined shaft 19. An accommodating bore 22 is formed through the camshaft 20. The coupling portion 21 has a splined recess 23 such that the splined shaft 19 mates with the coupling portion 21. The accommodating bore 22 accommodates a coil spring 24. The coil spring 24 urges the key cylinder 12 toward the switch knob 14 along the rotary axis of the key cylinder 12.

The camshaft 20 permits the key cylinder 12 to approach the camshaft 20 when the switch knob 14 is depressed from the manipulation prohibited position to the manipulation allowable position at the LOCK position. The camshaft 20 also moves the key cylinder 12 toward the switch knob 14 when the switch knob 14 is moved from the manipulation allowable position to the manipulation prohibited position at the LOCK position.

The cam 25 is secured to the camshaft 20 to rotate integrally with the camshaft 20. The cam 25 is a plate cam, which is rotated along the rotation of the camshaft 20. As shown in FIGS. 7(a), 7(b), 8(a), and 8(b), the cam 25 includes a first manipulation portion 26 and a second manipulation portion 27. The second manipulation portion 27 projects radially outward compared with the first manipulation portion 26.

As shown in FIGS. 1 to 8(b), the annular lock stopper 28 is arranged on the periphery of the cam 25. The lock stopper 28 is supported by a holder (not shown), which is secured to the vehicle, with the rotor case 10, The lock stopper 28 moves in a direction perpendicular to the rotary axis of the camshaft 20. The lock stopper 28 has a contact portion 29. The contact portion 29 is selectively brought into contact with the first manipulation portion 26 and the second manipulation portion 27. The lock stopper 28 is urged toward a steering shaft S by a coil spring 30, which is located between the holder and the lock stopper 28.

The lock stopper 28 has an outer surface 31a. The outer surface 31a has a groove 32, which extends along the rotary axis of the camshaft 20.

Figure 7A:
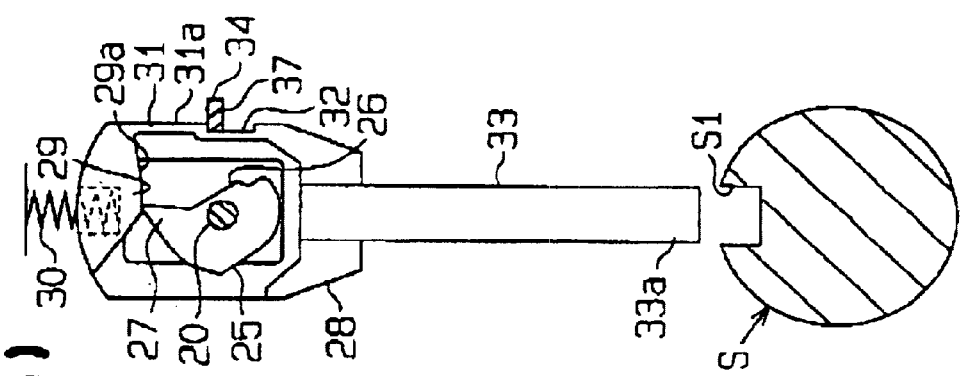
FIG. 7(a) is a partial diagrammatic view of the steering wheel locking device illustrating a state when the engaging portion of the engaging member contacts the side wall of a lock stopper and a lock bar of the lock stopper being engaged with the steering shaft.
Figure 7B:
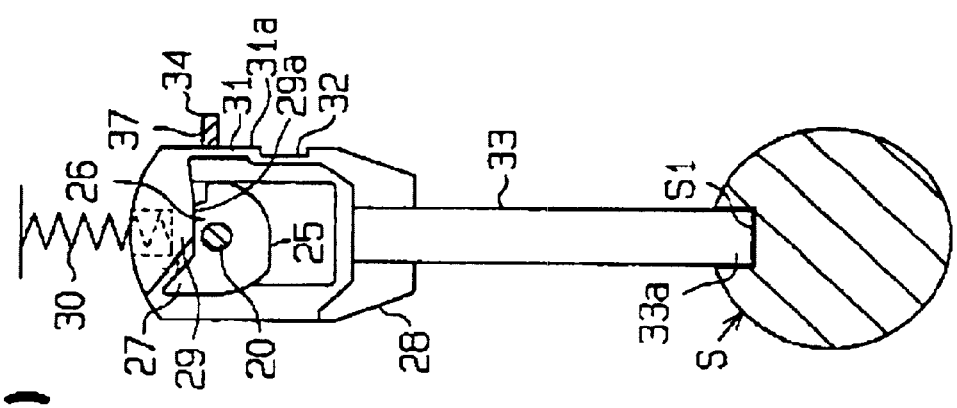
FIG. 7(b) is a partial diagrammatic view of the steering wheel locking device illustrating a state where the engaging portion of the engaging member is engaged with the groove of the lock stopper and the lock bar of the lock stopper is apart from the steering shaft.

The lock bar 33 (locking member) is secured to the lower end of the lock stopper 28 and moves integrally with the lock stopper 28. As shown in FIG. 7(a), when the first manipulation portion 26 contacts the contact surface 29a of the contact portion 29, the engaging portion 33a at the lower end of the lock bar 33 is engaged with the recess S1 of the steering shaft S (shaft locking position). When the lock bar 33 is engaged with the steering shaft S, the rotation of the steering shaft S is prohibited. On the other hand, as shown in FIG. 7(b), when the second manipulation portion 27 contacts the contact surface 29a of the contact portion 29, the engaging portion 33a of the lock bar 33 separates from the recess S1 (shaft unlocking position). When the lock bar 33 separates from the steering shaft S, the rotation of the steering shaft S is allowed.

As shown in FIGS. 1 to 8(b), the locking lever 34 is supported by the rotor case 10 such that the locking lever 34 pivots about a support shaft 35 in a surface parallel to the rotary axis of the key cylinder 12. The support shaft 35 is supported by an elongated groove 10a, which is formed in the rotor case 10. The support shaft 35 moves in a direction perpendicular to the rotary axis of the key cylinder 12. Since the support shaft 35 moves along the elongated groove 10a, the locking lever 34 also moves in a direction perpendicular to the rotary axis of the key cylinder 12. The contact portion 36, which is formed on one end of the locking lever 34, contacts the peripheral surface 12a of the key cylinder 12. An engaging portion 37, which is formed on the other end of the locking lever 34, contacts the outer surface 31a of the lock stopper 28.

The locking lever 34 and the support shaft 35 are urged toward the key cylinder 12 by the coil spring 38 arranged between the locking lever 34 and the rotor case 10.

As shown in FIG. 2, when the key K is not inserted into the key insertion portion 15 of the key cylinder 12, the coil spring 36 urges the contact portion 36 of the locking lever 34 against the slide body 17. In this state, the engaging portion 37 of the locking lever 34 is apart from the side wall 31 of the lock stopper 28.

Figure 8A:
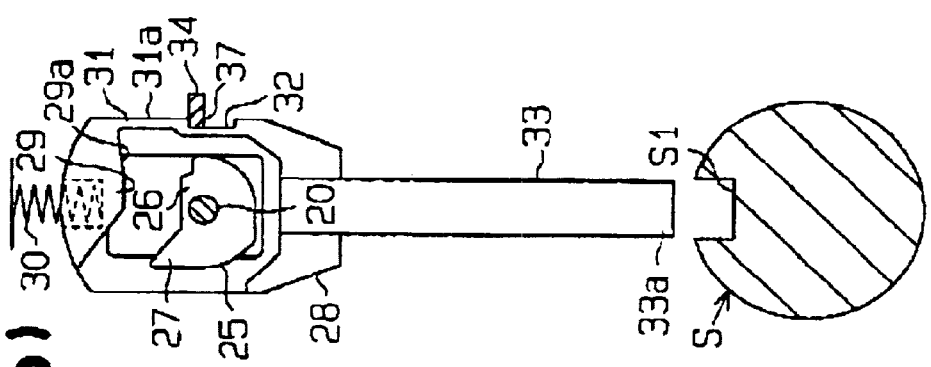
FIG. 8(a) is a partial diagrammatic view of the steering wheel locking device illustrating a state where the engaging portion of the engaging member is apart from the side wall of the lock stopper and the lock bar of the lock stopper is engaged with the steering shaft.

When the switch knob 14 is arranged at the manipulation allowable position at the LOCK position as shown in FIGS. 3 and 7(a), the contact portion 36 of the locking lever 34 contacts the peripheral surface 12a of the key cylinder 12 and the engaging portion 37 of the locking lever 34 contacts the outer surface 31a of the side wall 31 When the switch knob 14 is arranged at the manipulation prohibited position at the LOCK position as shown in FIGS. 2 and 8(a), the contact portion 36 of the locking lever 34 contacts the slide body 17, which has moved into the key insertion portion 15, and the engaging portion 37 of the locking lever 34 separates from the side wall 31 of the lock stopper 28.

When the switch knob 14 is shifted from the manipulation prohibited position shown in FIG. 2 to the manipulation allowable position shown in FIG. 3, the contact portion 36 of the locking lever 34 is at first in contact with the slide body 17 in the retaining bore 16. Then, the contact portion 36 is guided upward to contact the peripheral surface 12a of the key cylinder 12 by sliding along the guide surface 18. Meanwhile, the engaging portion 37 of the locking lever 34 is at first apart from the side wall 31. Then, the engaging portion 37 moves downward to contact the outer surface 31a of the side wall 31 as the contact portion 36 is guided upward.

When the switch knob 14 is manipulated from the LOCK position to the ACC position, ON position, or the START position, the contact portion 36 of the locking lever 34 contacts the peripheral surface 12a of the key cylinder 12. The engaging portion 37 of the locking lever 34 abuts against the lock stopper 28.

The operations of the steering wheel locking device of the preferred embodiment when the key K is used and not used are described below.

When the switch knob 14 is arranged at the manipulation prohibited position at the LOCK position without the key K being inserted in the key insertion portion 15 as shown in FIG. 2, a part of the slide body 17 is in the key insertion portion 15 and the contact portion 36 of the locking lever 34 contacts the slide body 17 in the retaining bore 16. In this state, the engaging portion 37 of the locking lever 34 is apart from the side wall 31 of the lock stopper 28. As a result, the engaging portion 33a of the lock bar 33 is engaged with the recess S1 of the steering shaft S (see FIG. 8(a)).

When the switch knob 14 is pressed from the manipulation prohibited position shown in FIG. 2 to the manipulation allowable position shown in FIG. 3, the key cylinder 12 moves along the rotary shaft. Then, the contact portion 36 of the locking lever 34 is guided upward to contact the peripheral surface 12a of the key cylinder 12 sliding along the guide surface 18. In this state, the engaging portion 37 of the locking lever 34 contacts the side wall 31 of the lock stopper 28 (see FIG. 7(a)).

When the switch knob 14 is switched from the LOCK position to the ACC position while the switch knob 14 is maintained at the manipulation allowable position, the camshaft 20, which is rotated with the key cylinder 12, rotates the cam 25. More specifically, when the switch knob 14 is at the LOCK position, the first manipulation portion 26 contacts the contact portion 29 of the lock stopper 28 as shown in FIG. 7(a). When the switch knob 14 is turned to the ACC position, the second manipulation portion 27 contacts the contact portion 29 of the lock stopper 28. As a result, the engaging portion 33a of the lock bar 33 separates from the recess S1 of the steering shaft S. Thus, the steering shaft S become unlocked. At this time, the engaging portion 37 of the locking lever 34 engages with the groove 32 of the lock stopper 28.

When the switch knob 14 is manipulated from the ACC position to the ON position and then further to the START position (not shown), the cam 25 is further rotated clockwise from the position shown in FIG. 7(b). As a result, the second manipulation portion 27 of the cam 25 separates from the contact portion 29 of the lock stopper 28. At this time, the contact portion 36 of the locking lever 34 is still in contact with the peripheral surface 12a of the key cylinder 12. Therefore, the engaging portion 37 of the locking lever 34 is kept engaged with the groove 32 of the lock stopper 28. Thus, even when the switch knob 14 is manipulated from the ACC position to the ON position and further to the START position, the engaging portion 33a of the lock bar 33 is kept away from the recess S1 of the steering shaft S. That is, the steering shaft S is kept unlocked.

Figure 8B:
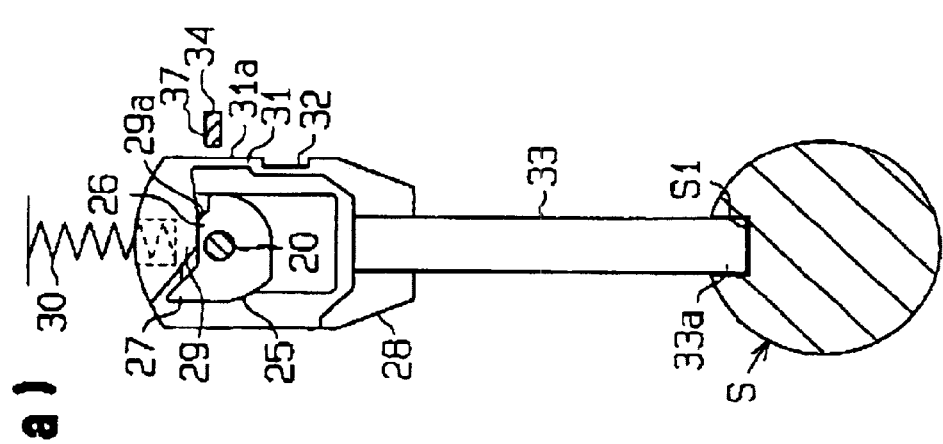
FIG. 8(b) is a partial diagrammatic view of the steering wheel locking device illustrating a state where the cam is arranged at a LOCK position from the state shown in FIG. 7(b).

When the switch knob 14 is switched from the ACC position to the LOCK position, the cam 25 is rotated from the position shown in FIG. 7(b) to the position shown in FIG. 8(b). In this state, if the switch knob 14 is kept at the manipulation allowable position at the LOCK position, the contact portion 36 of the locking lever 34 is kept in contact with the peripheral surface 12a of the key cylinder 12 as shown in FIG. 1. Thus, the engaging portion 37 of the locking lever 34 is kept engaged with the groove 32 of the lock stopper 28. Therefore, the engaging portion 33a of the lock bar 33 is kept away from the recess S1 of the steering shaft S and the steering shaft S is kept unlocked.

When the switch knob 14 shown in FIG. 1 is restored to the manipulation prohibited position, the contact portion 36 of the locking lever 34 slides into the retaining bore 16 and contacts the slide body 17 as shown in FIG. 2, Therefore, the engaging portion 37 of the locking lever 34 separates from the side wall 31 of the lock stopper 28 as shown in FIG. 8(a). As a result, the engaging portion 33a of the lock bar 33 engages with the recess S1 of the steering shaft S by the force of the coil spring 30. Thus, the steering shaft S is locked.

When the proper key K is inserted into the key insertion portion 15 while the switch knob 14 is at the manipulation prohibited position at the LOCK position (see FIG. 2), the slide body 17 moves upward from the key insertion portion 15 and the end surface of the slide body 17 that is radially outward of the key cylinder 12 becomes flush with the peripheral surface 12a of the key cylinder 12 as shown in FIG. 4. In this state, the contact portion 36 of the locking lever 34 contacts the slide body 17 outside the retaining bore 16. Therefore, the engaging portion 37 of the locking lever 34 is pressed against the outer surface 31a of the side wall 31 of the lock stopper 28.

When the switch knob 14 is depressed to the manipulation allowable position and shifted from the LOCK position to the ACC position (see FIG. 7(b)), the engaging portion 37 of the locking lever 34 engages with the groove 32 as in the case when the key is not used. In this state, the engaging portion 33a of the lock bar 33 separates from the recess S1 of the steering shaft S and the steering shaft S is unlocked. Also, even when the switch knob 14 is shifted from the ACC position to the ON position and further to the START position (not shown), the engaging portion 33a of the lock bar 33 is kept away from the recess S1 of the steering shaft S. That is, the steering shaft S is kept unlocked.

When the switch knob 14 is turned from the ACC position to the LOCK position as in the case when the key is not used and maintained at the manipulation allowable position, the contact portion 36 of the locking lever 34 is kept in contact with the peripheral surface 12a of the key cylinder 12. Therefore, the engaging portion 37 is kept engaged with the groove 32 of the lock stopper 28, which in turn keeps the engaging portion 33a of the lock bar 33 away from the recess S1 of the steering shaft S. Thus, the steering shaft S is kept unlocked.

When the switch knob 14 is restored from the manipulation allowable position to the manipulation prohibited position, the contact portion 36 of the locking lever 34 moves from the position shown in FIG. 5 to the position shown in FIG. 6. That is, when the switch knob 14 is at the manipulation allowable position, the contact portion 36 contacts the peripheral surface 12a of the key cylinder 12. When the switch knob 14 is shifted to the manipulation prohibited position, the contact portion 36 moves to contact the slide body 17. In this state, the engaging portion 37 of the locking lever 34 is still engaged with the groove 32 of the lock stopper 28. As a result, the engaging portion 33a of the lock bar 33 is kept away from the recess S1 of the steering shaft S as shown in FIG. 8(b). Thus, the steering shaft S is kept unlocked.

When the key K is pulled out from the key insertion portion 15 in this state, the slide body 17 moves toward the key insertion portion 15 from the opening 16a as shown in FIG. 2. Thus, the contact portion 36 of the locking lever 34 contacts the slide body 17 in the retaining bore 16. Therefore, the engaging portion 37 of the locking lever 34 separates from the side wall 31 of the lock stopper 28. Then, the engaging portion 33a of the lock bar 33 engages with the recess S1 of the steering shaft S as shown in FIG. 8(a) by the force of the coil spring 30. As a result, the steering shaft S is locked only when the key K is pulled out from the key insertion portion 15 after the switch knob 14 is turned to LOCK position and restored to the manipulation prohibited position.

The preferred embodiment provides the following advantages.

(1) In the case where the key K is not used, the steering shaft S is locked when the switch knob 14 is turned from the ACC position to the LOCK position and further moved from the manipulation allowable position to the manipulation prohibited position. In the case where the key K is used, the steering shaft S is locked when the key K is pulled out from the key cylinder 12 after the switch knob 14 is turned from the ACC position to the LOCK position and further moved from the manipulation allowable position to the manipulation prohibited position.

(2) When moving the switch knob 14 from the manipulation prohibited position to the manipulation allowable position at the LOCK position, the guide surface 18, which is arranged on one end of the opening 16a of the key cylinder 12, guides the contact portion 36 of the locking lever 34. The contact portion 36 is guided to the position where the contact portion 36 is brought into contact with the peripheral surface 12a of the key cylinder 12 from the position where the contact portion 36 contacts the slide body 17 inside the retaining bore 16. Therefore, the switch knob 14 can be moved smoothly from the manipulation prohibited position to the manipulation allowable position. The structure is simple in that only the guide surface 18 is formed on the periphery of the opening 16a. Thus, the present invention can be manufactured at a low cost and no additional parts are required.

(3) The lock bar 33 is operated by the cam 25, which is rotated in accordance with the manipulation of the switch knob 14, and the lock stopper 28. The operation of the lack bar 33 prohibits or allows the rotation of the steering shaft S. The locking lever 34 is operated in accordance with the position of the key cylinder 12 and whether the key K is used. The locking lever 34 selectively locks and unlocks the steering shaft 5 via the lock bar 33, which is secured to the lock stopper 28. Therefore, the steering wheel locking device has a simple mechanism to lock the steering shaft S when the key is pulled out if the key is used.

It should be apparent to those skilled in the art that the present invention may be embodied in many other specific forms without departing from the spirit or scope of the invention. Particularly, it should be understood that the invention may be embodied in the following forms.

The key to be inserted into the key cylinder may be a mechanical key. In this case, the key cylinder judges whether the key is proper.

The actuation position may be the ON position, which is directly selected from the LOCK position.

Therefore, the present examples and embodiments are to be considered as illustrative and not restrictive and the invention is not to be limited to the details given herein, but may be modified within the scope and equivalence of the appended claims.

What is claimed is:

1. A steering wheel locking device, which is attached to a smart ignition system to lock a steering shaft, the device comprising:
   a rotor, which has a key insertion portion, wherein the rotor is rotated between a locked position and an actuation position;

a switch knob for rotating the rotor wherein the switch knob is coupled to the rotor and rotates integrally with the rotor, wherein the switch knob can axially move from a manipulation prohibited position to a manipulation allowable position with the rotor while the rotor is arranged at the locked position, and wherein when the switch knob is at the manipulation prohibited position, the rotation of the switch knob is prohibited, and wherein when the switch knob is at the manipulation allowable position, the rotation of the switch knob is allowed, and wherein when the switch knob is depressed at the manipulation prohibited position, the switch knob moves to the manipulation allowable position, and wherein the rotor can be rotated from the locked position to the actuation position while the switch knob is arranged at the manipulation allowable position;

a locking mechanism for locking the steering shaft, wherein, when the rotor is rotated from the locked position to the actuation position, the locking mechanism releases the lock of the steering shaft; and an unlock maintaining mechanism, wherein, when the rotor is rotated from the locked position to the actuation position, the unlock maintaining mechanism maintains the locking mechanism unlocked, and the unlock maintaining mechanism further includes a movable body, wherein the movable body is moved by a key inserted in the key insertion portion, and wherein, when the rotor is rotated from the actuation position to the locked position, the unlock maintaining mechanism maintains the locking mechanism unlocked by the engagement of the key and the movable body.

2. The steering wheel locking device according to claim 1, wherein, when the rotor is rotated from the actuation position to the locked position while the key is inserted in the key insertion portion, the movable body supports the unlock maintaining mechanism so that the unlock maintaining mechanism maintains the locking mechanism unlocked regardless of the axial position of the switch knob, and wherein the movable body releases the unlock maintaining mechanism so that the locking mechanism locks the steering shaft when the rotor is rotated from the actuation position to the locked position without the key being inserted in the key insertion portion and the switch knob is moved from the manipulation allowable position to the manipulation prohibited position.

3. The steering wheel locking device according to claim 1, wherein the locking mechanism comprises:

a locking member, which is moved between a shaft locking position, at which the locking member engages with the steering shaft to lock the steering shaft, and a shaft unlocking position, at which the locking member separates from the steering shaft; and a cam mechanism for moving the locking member with the rotation of the rotor, wherein, when the rotor is rotated from the locked position to the actuation position, the cam mechanism moves the locking member from the shaft locking position to the shaft unlocking position.

4. The steering wheel locking device according to claim 3, wherein the cam mechanism includes a rotary cam, which rotates integrally with the rotor, and a lock stopper, which is attached to the locking member and is moved by the rotary cam.

5. The steering wheel locking device according to claim 3, wherein the rotor has a retaining bore, wherein the retaining bore accommodates the movable body, wherein the movable body can move along the radial direction of the rotor between a radially inward first position and a radially outward second position, wherein the movable body is arranged at the first position when the key is not inserted in the key insertion portion, and is arranged at the second position when the key is inserted in the key insertion portion.

6. The steering wheel locking device according to claim 5, wherein the unlock maintaining mechanism includes a locking lever, wherein the locking lever engages with the locking member when the locking member is at the shaft unlocking position thereby maintaining the locking member at the shaft unlocking position, wherein the locking lever has a contact portion, which contacts the movable body when the switch knob is arranged at the manipulation prohibited position, and contacts the peripheral surface of the rotor when the switch knob is arranged at the manipulation allowable position, wherein, when the contact portion contacts the peripheral surface of the rotor or the movable body located at the second position, the locking lever is urged to engage with the locking member, and wherein, when the contact portion contacts the movable body located at the first position, the locking lever is disengaged from the locking member.

7. The steering wheel locking device according to claim 6, wherein a guide portion is formed at the periphery of the opening of the retaining bore, and wherein the guide portion guides the contact portion of the locking lever to the peripheral surface of the rotor.

8. A steering wheel locking device, which is attached to a smart ignition system to lock a steering shaft, the device comprising:

a rotor, which has a key insertion portion, wherein the rotor is rotated between a locked position and an actuation position;

a switch knob for rotating the rotor, wherein the switch knob is coupled to the rotor and rotates integrally with the rotor, wherein the switch knob can axially move from a manipulation prohibited position to a manipulation allowable position with the rotor while the rotor is arranged at the locked position, wherein the manipulation prohibited position prohibits the rotation of the switch knob, and the manipulation allowable position allows the rotation of the switch knob, wherein, when the switch knob is depressed at the manipulation prohibited position, the switch knob moves to the manipulation allowable position, and wherein the rotor can be rotated from the locked position to the actuation position while the switch knob is arranged at the manipulation allowable position;

a locking mechanism for locking the steering shaft, wherein the locking mechanism includes a locking member, wherein the locking member can be shifted between a shaft locking position, at which the locking member engages with the steering shaft to restrict the rotation of the steering shaft, and a shaft unlocking position, at which the locking member does not restrict the rotation of the steering shaft;

an unlock maintaining mechanism, wherein, when the rotor is rotated from the locked position to the actuation position, the unlock maintaining mechanism maintains the locking mechanism unlocked, and the unlock maintaining mechanism further includes a movable body, wherein the movable body is moved by a key inserted in the key insertion portion, and wherein, when the rotor is rotated from the actuation position to the locked position, the unlock maintaining mechanism maintains the locking mechanism unlocked by the engagement of the key and the movable body.

9. The steering wheel locking device according to claim 8, wherein, when the rotor is rotated from the actuation position to the locked position while the key is inserted in the key insertion portion, the movable body supports the unlock maintaining mechanism so that the unlock maintaining mechanism maintains the locking mechanism unlocked regardless of the axial position of the switch knob, and wherein the movable body releases the unlock maintaining mechanism so that the locking mechanism locks the steering shaft when the rotor is rotated from the actuation position to the locked position without the key being inserted in the key insertion portion and the switch knob is moved from the manipulation allowable position to the manipulation prohibited position.

10. The steering wheel locking device according to claim 8, wherein the locking mechanism comprises:

a cam mechanism for moving the locking member with the rotation of the rotor, wherein, when the rotor is rotated from the locked position to the actuation position, the cam mechanism moves the locking member from the shaft locking position to the shaft unlocking position.

11. The steering wheel locking device according to claim 10, wherein the cam mechanism includes a rotary cam, which rotates integrally with the rotor, and a lock stopper, which is attached to the locking member and is moved by the rotary cam.

12. The steering wheel locking device according to claim 10, wherein the rotor has a retaining bore, wherein the retaining bore accommodates the movable body, wherein the movable body can move along the radial direction of the rotor between a radially inward first position and a radially outward second position, wherein the movable body is arranged at the first position when the key is not inserted in the key insertion portion, and is arranged at the second position when the key is inserted in the key insertion portion.

13. The steering wheel locking device according to claim 12, wherein the unlock maintaining mechanism includes a locking lever, wherein the locking lever engages with the locking member when the locking member is at the shaft unlocking position thereby maintaining the locking member at the shaft unlocking position, wherein the locking lever has a contact portion, which contacts the movable body when the switch knob is arranged at the manipulation prohibited position, and contacts the peripheral surface of the rotor when the switch knob is arranged at the manipulation allowable position, wherein, when the contact portion contacts the peripheral surface of the rotor or the movable body located at the second position, the locking lever is urged to engage with the locking member, and wherein, when the contact portion contacts the movable body located at the first position, the locking lever is disengaged from the locking member.

* * * * *